(12) United States Patent
Aldridge et al.

(10) Patent No.: US 11,981,234 B2
(45) Date of Patent: May 14, 2024

(54) ADJUSTABLE SEAT ASSEMBLY WITH OPERATOR CONTROLS FOR RIDING VEHICLES

(71) Applicant: Honda Motor Co., Ltd., Tokyo (JP)

(72) Inventors: Teegan L. Aldridge, McLeansville, NC (US); Vincent A. Prinzo, Cedar Grove, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 724 days.

(21) Appl. No.: 17/150,311

(22) Filed: Jan. 15, 2021

(65) Prior Publication Data

US 2022/0227262 A1 Jul. 21, 2022

(51) Int. Cl.
| | | |
|---|---|---|
| *B60N 2/07* | (2006.01) | |
| *A01D 34/82* | (2006.01) | |
| *A01D 67/04* | (2006.01) | |
| *B60N 2/06* | (2006.01) | |
| *B60N 2/38* | (2006.01) | |
| *B62D 1/12* | (2006.01) | |
| *A01D 101/00* | (2006.01) | |

(52) U.S. Cl.
CPC ......... *B60N 2/0735* (2013.01); *A01D 34/824* (2013.01); *A01D 67/04* (2013.01); *B60N 2/06* (2013.01); *B60N 2/38* (2013.01); *B62D 1/12* (2013.01); *A01D 2101/00* (2013.01)

(58) Field of Classification Search
CPC ...... A01D 7/04; A01D 2/0735; A01D 34/824; B62D 1/12; B60N 2/06; B60N 2/38
See application file for complete search history.

(56) References Cited

U.S. PATENT DOCUMENTS

| | | | |
|---|---|---|---|
| 7,882,914 B2 * | 2/2011 | Scheele | A01D 34/82 280/89.12 |
| 8,186,475 B2 | 5/2012 | Sugden et al. | |
| 2007/0095040 A1 | 5/2007 | Berkeley | |
| 2020/0022303 A1 | 1/2020 | Gindt et al. | |
| 2020/0120871 A1 | 4/2020 | Woodrum | |

FOREIGN PATENT DOCUMENTS

| | | | |
|---|---|---|---|
| CN | 113771963 A | * | 12/2021 |
| JP | H05292829 A | | 11/1993 |

* cited by examiner

*Primary Examiner* — Faye M Fleming
(74) *Attorney, Agent, or Firm* — Plumsea Law Group, LLC

(57) ABSTRACT

Systems and mechanisms for facilitating concurrent positional adjustments of a seat with one or more steering controllers along a longitudinal direction of a vehicle, are disclosed. The embodiments provide a mechanism by which operators of a wide range of body types may comfortably occupy and use vehicles configured with lap bar controls, such as zero-turn radius mowers. In one example, the seat and steering controllers are both mounted on a support structure that is configured to be movable relative to a chassis of the vehicle.

20 Claims, 11 Drawing Sheets

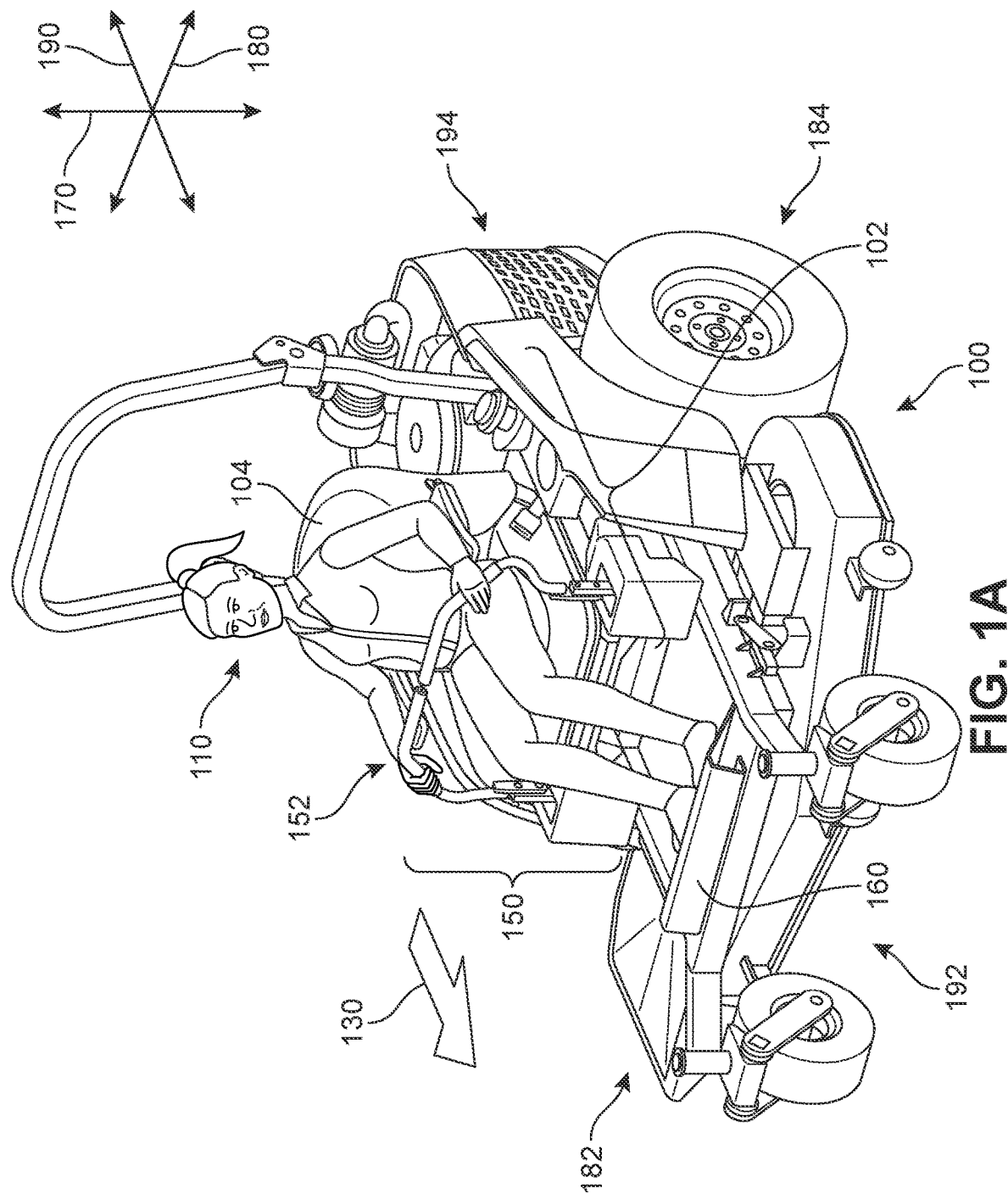

ADJUSTABLE SEAT ASSEMBLY WITH OPERATOR CONTROLS FOR RIDING VEHICLES

BACKGROUND

1. Field of the Disclosure

The present disclosure generally relates to ridable grass mowing machines, and specifically to an adjustable system for operator control and seat positioning in mowing machines. More particularly, the disclosed subject matter relates to adjustable vehicular seat assemblies, components for adjusting vehicular seat assemblies, and methods of adjusting vehicular seat assemblies.

2. Description of Related Art

Zero turning radius ("ZTR") vehicles such as lawn mowers have at least one independently powered rear drive wheel on each side of a frame. Many ZTR mowers have a twin stick control system. A pair of motion control levers or sticks or lap bars may be provided side-by-side, with each lever or stick controlling one of the rear drive wheels. When both levers or sticks are advanced together forwardly out of their neutral position, both rear drive wheels rotate forwardly to cause the ZTR mower to move forward. A ZTR mower may be steered by advancing one lever or stick more than the other.

These types of vehicles can be provided with various systems and apparatus for adjusting the seats of vehicular occupants. For example, vehicular seats can be adjustable in a longitudinal direction of the vehicle, such as toward and away from the front of the vehicle. This front and rear adjustment may be especially beneficial because it enables operators of different sizes to be accommodated. For example, a relatively large passenger may desire to sit in a relatively rearward position, while a relatively forward position may be desirable for a relatively small passenger. This is particularly advantageous in mowers that include foot pedal controls.

However, the seat adjustment capacity for ZTR mowers has remained limited, in large part due to the need to accommodate the positioning of the control levers. The control levers or sticks on a ZTR mower are typically mounted on the vehicle frame. Thus, movement of the seat position is restricted in order to preserve operator access to the relatively stationary control levers.

There is a need in the art for a system that improves accessibility of the operator seating to enable use of these vehicles by a wider range of body types.

SUMMARY

The disclosed embodiments provide methods and systems for providing improved seating adjustments for riding vehicles. The proposed seat assembly enables adjustment of not only the seat but also the steering controllers. Thus, when a person moves the seat assembly, the distance between the person and the steering controllers remains substantially the same, regardless of her seat's position relative to the pedal controls.

In one aspect, an adjustable seat assembly system for a vehicle includes a seat assembly including a seat and at least a first steering controller disposed at a first distance from the seat. The system also includes a slider assembly, where the seat and first steering controller are both mounted on the slider assembly such that the first distance is maintained between the seat and first steering controller when an adjustment of the position of the seat occurs in a longitudinal direction.

Another aspect provides a riding vehicle with an adjustable seat assembly system. The riding vehicle includes a chassis and a slider assembly mounted onto the chassis. In addition, the vehicle includes a support structure connected to the slider assembly, and a seat and a pair of steering controllers both fixedly attached to the support structure. In addition, a change in longitudinal position of the seat is accompanied by a corresponding change in longitudinal position of the pair of steering controllers.

Another aspect provides a seat assembly adjustment mechanism for facilitating concurrent positional adjustments of a seat with one or more steering controllers along a longitudinal direction of a vehicle. The mechanism includes a pair of sliders that extend substantially parallel to the longitudinal direction of the vehicle, a mounting plate that supports the seat, and a base frame that supports the mounting plate and the steering controllers, where the base frame is configured to be movable along the pair of sliders.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIGS. 1A and 1B illustrate two different operators seated in a riding vehicle that includes an adjustable seat assembly system, according to an embodiment;

DETAILED DESCRIPTION

Many ZTR mowers have a dual lever control system in which two control levers or bars may be provided side-by-side, with each lever or bar controlling one of the drive wheels. The control levers are usually mounted on the vehicle frame so that each has a first pivot axis allowing the lever or stick in the operating position to pivot forwardly in an arc to turn the wheel in forward, or pivot rearwardly to turn the wheel in reverse, as well as perform other steering operations. Typically, the control levers are configured as lap bars that extend over the lap area of the operator or directly in front of the operator. Each control lever or stick may have a neutral position in which the corresponding drive wheel is at rest. The pair of control levers may be mounted adjacent to or in front of the operator seat.

The mowers can be provided with various systems and apparatus for adjusting the seats of vehicular occupants. For example, vehicular seats can be adjustable in a longitudinal direction of the vehicle, such as toward and away from the front of the vehicle. Operators may be desirous of this type of forward and rearward adjustment for various reasons, such as to facilitate the user's operation of the vehicle. For example, a relatively small passenger may need to place the seat in a relatively forward position to enable access to the vehicular controls, such as the control levers, acceleration and brake pedals, dock height adjustment pedal, etc. On the other hand, a relatively larger passenger may desire or need the seat to be in a relatively rearward position to enable the same access to the vehicular controls. In some cases, operators may simply wish to adjust their seat in order to enhance their own comfort. For example, a relatively large passenger may be more comfortable with the seat in a relatively rearward position based on an increased amount of space accessible to the operator, such as by the increased open space defined between the vehicle seat and a front of the vehicle. However, a relatively small passenger may achieve the same amount or type of comfort when disposed in a relatively forward position.

Various mechanisms and components can be used to enable or facilitate forward and rearward adjustment of vehicular seats, including sliders, bearings, grease, etc. These mechanisms are however restricted to a range that provides a comfortable spacing between the occupant and the lap control bars. In other words, while the seat may be adjusted, the control levers remain docked or anchored in place. Unfortunately, for those operators at the smaller and larger ends of the size spectrum, such a limited range can significantly reduce both comfort and control accessibility. Potential operators may be deterred from use of the vehicle as a result of their inability to adjust the operator seat to a position that accommodates their particular body size.

Figure 1B:
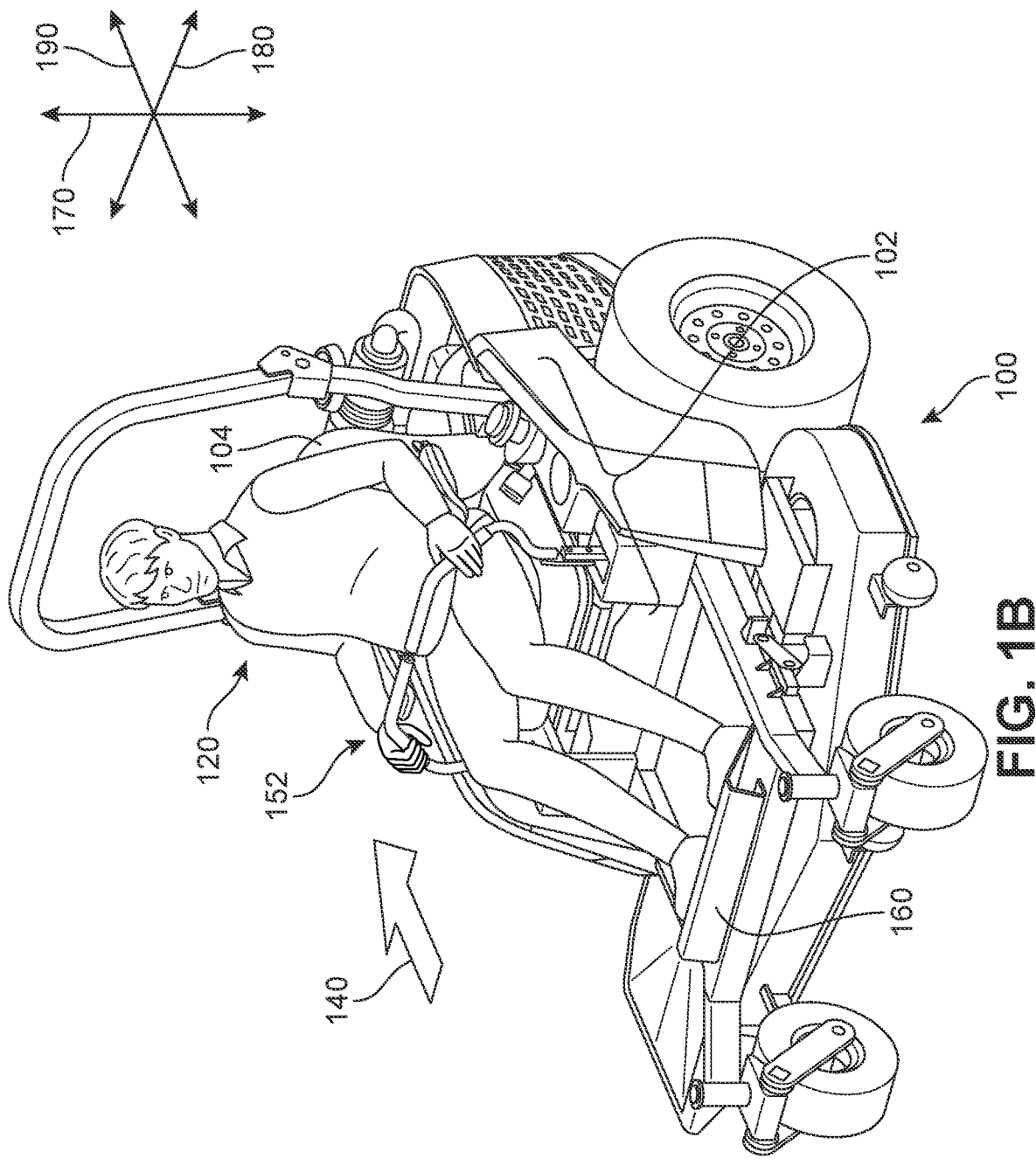

The embodiments disclosed herein provide a novel mechanism by which operators of a wider range of body types may comfortably occupy and use vehicles configured with lap bar controls. In order to provide an illustration of the technical problem being solved herein, FIGS. 1A and 1B depict an embodiment of a vehicle such as a riding mower 100 configured with steering controllers 150 and pedal controls 160. The vehicle shown in the drawings herein are specialized for use on lawns or other grassy areas, and can be referred to as a lawn mower or riding mower. However, the disclosed systems can be used with any vehicle that is configured for travel along any one or combination of improved, unimproved, and unmarked paths. For example, the system may be used in other types of ground maintenance vehicles, such as vehicles configured for fertilizing, aerating, dethatching, vacuuming/blowing, etc. Furthermore, embodiments are intended to include or otherwise cover any type of automobile, including a passenger car, minivan, truck, tractor, other types of all-terrain vehicle (ATV), semi-tractor, off-highway vehicle, etc. In fact, embodiments are intended to include or otherwise cover configurations of the system for use in any other type of vehicle, such as an aircraft, boat, ship, train, spacecraft, etc. Some other embodiments can be used in non-vehicular applications, such as for amusement park rides, playground apparatus, or any other situation where such a system can enhance operator comfort and control access. In addition, while examples described herein use a twin lever control system, it is to be understood that this configuration is not limiting as embodiments may find application to vehicles having other, e.g., single, control lever configurations or to configurations using other types of control members.

In the embodiment of FIGS. 1A and 1B, the steering controllers 150 include two levers 152 extending from distal sides of the mower 100 toward a centerline of the mower, forming a substantially U-shaped unit extending over and across the rider's lap. In FIG. 1A, a first person 110 is seated in a mower seat 104, and in FIG. 1B a second person 120 is shown seated in the same mower seat 104. The mower 100 may include a frame supported on a forward end by front wheels, and a rear mounted engine behind the operator seat. The seat may be mounted over the frame for a seated operator to use left and right motion control levers or sticks.

For purposes of reference, the components of the mower 100 can be described as including a vertical axis 170, a longitudinal axis 190, and a lateral axis 180. The term "longitudinal," as used throughout this detailed description and in the claims, refers to a direction extending along the length of a component (from the rear of the component to the front). For example, a longitudinal direction of the mower 100 extends from a forward portion 192 to a rearward portion 194. The term "forward" or "front" is used to refer to the general direction which lies forward of a central region of the mower 100 (e.g., associated with seat 104), and the term "rearward" or "back" is used to refer to the opposite direction, i.e., the direction which lies rearward of the central region. In addition, the term "lateral direction," as used throughout this detailed description and in the claims, refers to a side-to-side direction extending along the width of a component. In this case, the lateral direction may extend between a first side portion ("first side") 182 and a second side portion ("second side") 184 of the mower 100, with the first side 182 being the region disposed on one side of the central region, and the second side 184 being the region that is disposed on the opposite side of the central region.

Furthermore, the term "vertical," as used throughout this detailed description and in the claims, refers to a direction generally perpendicular to both the lateral and longitudinal directions. For example, in cases where a component is disposed on a ground surface, the vertical direction may extend from the ground surface upward. It will be understood that each of these directional adjectives may be applied to individual components of the mower 100. The term "upward" refers to the vertical direction heading away from a ground surface, while the term "downward" refers to the vertical direction heading toward the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

It will be understood that the forward portion 192, rearward portion 194, first side 182, and second side 184 are only intended for purposes of description and are not intended to demarcate precise regions of the mower. For example, in some cases, one or more of the regions may overlap. Likewise, the first side and the second side are intended to represent generally two sides, rather than precisely demarcating the mower into two halves.

It may be appreciated that in order for any rider to successfully operate and maneuver the mower 100, the rider must be within contact range of all controls for the machine, including in this case the levers 152 and the pedal controls 160. However, as shown in FIGS. 1A and 1B, the first person 110 and the second person 120 have significantly different body types: first person 110 is short and has a much smaller body frame, while second person 120 is tall and has a much larger body frame. Thus, when first person 110 is seated in mower 100, she must be positioned much nearer to the pedal controls 160 than second person 120. In other words, the seat 104 must be pulled forward in a first direction 130 (relative to longitudinal axis 190) and be disposed quite close to the pedal controls 160 for first person 110 to be able to press her feet against the pedal surface. In contrast, when second person 120 is seated in mower 100, he must be positioned much farther from the pedal controls 160 than first person 110. In other words, the seat 104 must be pushed back in a second direction 140 (relative to longitudinal axis 190) and be spaced at a greater distance from the pedal controls 160 for second person 120 to be able to comfortably press his feet against the pedal surface.

In traditional riding mowers, the presence of the levers 152 greatly restricts the range of longitudinal seat adjustments due to the need for the operator to maintain a position that is within arms-reach of the levers 152. The operator may be able to move their seat, but find that they are either no longer able to easily reach the levers 152 because they have moved too far back, or that the levers 152 are compressed against their abdomen and restricting any further forward movement. In order to address this predicament, the proposed embodiments provide an operator position adjustment system that is configured to enable free movement of the operator without consideration of the relative position of the levers. This is possible due to an adjustment system configured to move not only the seat 104, but an entire seat assembly 102, where the seat assembly 102 includes both the seat 102 and the steering controllers 150 (which includes the levers 152). Thus, when first person 110 moves seat assembly 102 forward in first direction 130, the distance between the first person 110 and the levers 152 remains substantially the same, regardless of her seat's position relative to the pedal controls 160. Similarly, when second person 120 approaches the mower 100 to exchange places with first person 110, he first moves the seat assembly 102 back in second direction 140 in order to fit into the operator space. While the seat assembly 102 moves backward, the seat 104 and steering controllers 150 remain fixed relative to one another, regardless of their increasing distance relative to the pedal controls 160. In other words, the adjustment of the position of the seat 104 is accompanied by a contemporaneous or concurrent adjustment in the position of the steering controllers 150.

Figure 2:
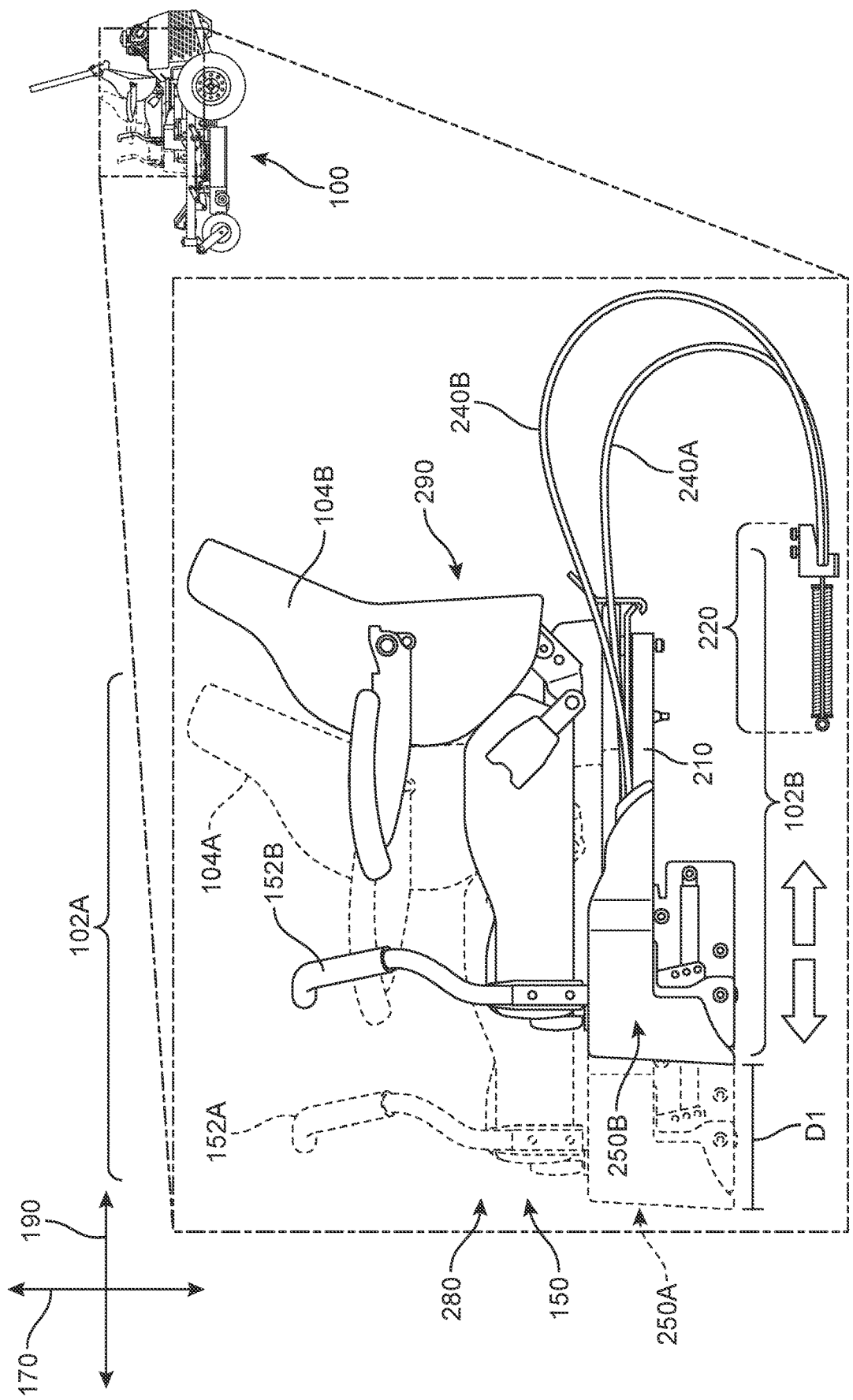
FIG. 2 is a side view of the adjustable seat assembly system in which two seating positions are depicted, according to an embodiment.

For purposes of clarity, an isolated view of the seat assembly as it moves from a first position 280 (also represented in FIG. 1A) to a second position 290 (also represented in FIG. 1B) is presented in FIG. 2. In FIG. 2, the reference letter "a" indicates the first position, and the reference letter "b" indicates the second position. As shown in FIG. 2, the first position 280 is disposed further forward relative to the second position 290 by a first distance D1. It should be understood that in different embodiments the distance D1 can vary, depending at least in part on the overall length of the mower itself. In this view, it can be more clearly seen that when the seat assembly 102, including both seat 104 and steering controllers 150, transitions from the first position 280 to the second position 290, it is not only the seat 104 that moves, but rather a collection of components comprising the seat assembly 102, where the seat assembly 102 also includes the steering controllers 150 (with the levers 152) and a base unit 250 disposed along the bottom of the seat 104. In one embodiment, the base unit 250 is configured to slide back and forth along a pair of support bars 210 mounted onto a frame of the mower. The base unit 250 is further connected to a pair of cables 240 extending outward toward the rear (only one cable is visible in FIG. 2), where the cables 240 each terminate at a transmission connection terminal 220. Further details regarding the base unit 250, support bars 210, and cables 240 will be discussed with reference to FIGS. 3-5 below.

Figure 3:
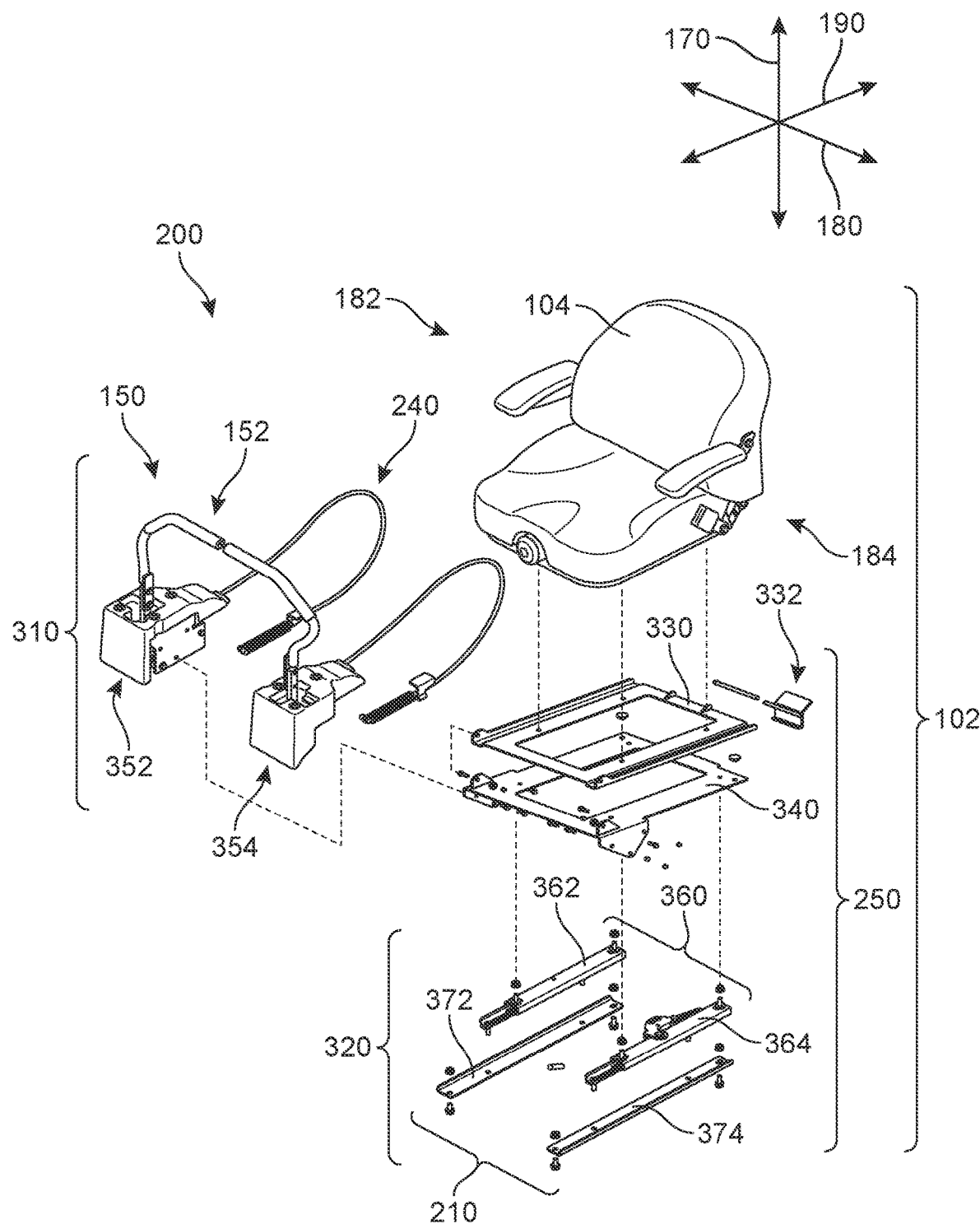
FIG. 3 is an isometric exploded view of an adjustable seat assembly system, according to an embodiment.

To better provide context to the reader, FIG. 3 presents an isometric exploded view of an embodiment of an operator seat assembly position adjustment system ("system") 200 configured to enable longitudinal motion of both the seat and steering controllers of a riding vehicle. In FIG. 3, it can be seen that system 200 includes the seat assembly 102 as well as the pair of support bars 210, comprising a first support bar 372 and a second support bar 374. As noted earlier, the seat assembly 102 includes the seat 104, the steering controllers 150, and the base unit 250. It can be seen that the base unit 250 includes components that help enable the relative motion of the seat assembly 102.

In this example, the base unit 250 includes a seat mounting plate 330 disposed directly below the seat 104 that is mounted onto the bottom surface of the seat 104 when assembled. As one example, a connector 332 can be used to lock the two components together. Below the seat mounting plate 330 is a base frame 340 configured to anchor both the steering controllers 150 and the seat mounting plate 330. The steering controllers 150 further comprise a first controller 352 and a second controller 354. For purposes of reference, the steering controllers 150, the cables 240, the seat mounting plate 330, and the base frame 340 are collectively labeled as a control assembly 310. Further details regarding the control assembly 310 will be provided with respect to FIG. 4 below.

In addition, the base frame 340 is mounted on two slider components ("sliders") 360 comprising a first slider 362 and a second slider 364. Similarly, the two sliders 360 are connected to the pair of support bars 210. For purposes of reference, the sliders 360 and the support bars 210 are collectively labeled as a slider assembly 320. Further details regarding the slider assembly 320 will be provided with respect to FIG. 5 below.

Figure 4:
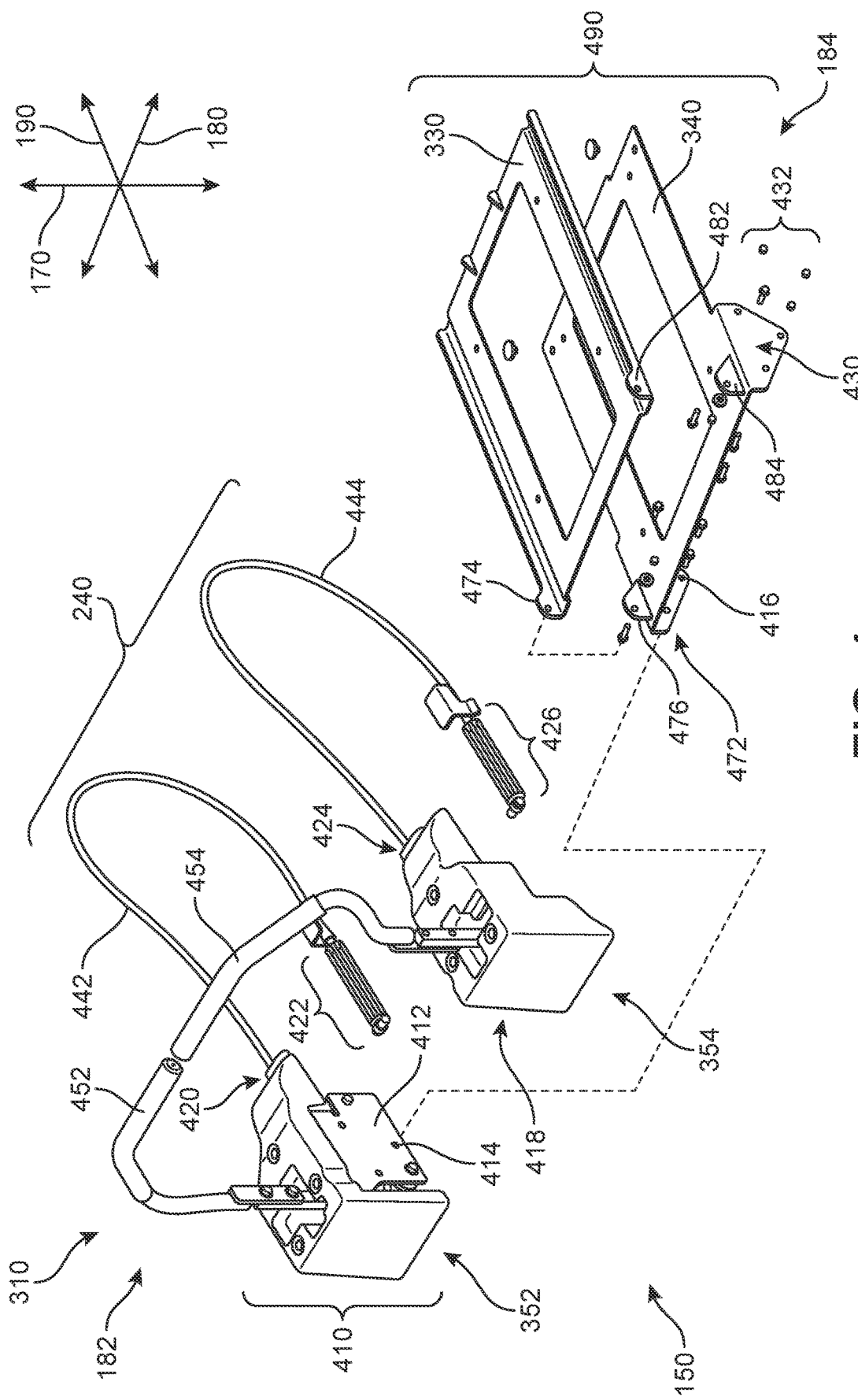
FIG. 4 is an isometric exploded view of a control assembly of the adjustable seat assembly system, according to an embodiment.

Referring next to FIG. 4, additional details regarding the control assembly 310 are discussed. As noted earlier, the steering controllers 150 comprise a first controller 352 and a second controller 354. The first controller 352 further comprises a first motion control lever ("first lever") 452 and the second controller 354 a second motion control lever ("second lever") 454. In some embodiments, each lever comprises an arm that extends vertically upward and then curves inward until the outermost ends of each lever are nearly touching (when the vehicle is in neutral, as presented in FIG. 4). As a general matter, in different embodiments, these left and right motion control levers or sticks are pivotable between forward, neutral and reverse positions. For example, the control levers can be configured to pivot outward when the vehicle is put into neutral. Each controller further includes a base component 410. Each motion control lever or stick may be mounted to a base component 410 such that the lever may pivot forwardly in a first direction, causing a rear drive wheel to rotate forward, or pivot rearwardly in a second direction, causing the rear drive wheel to rotate backward. Each motion control lever or stick may have a neutral position in which the corresponding rear drive wheel is at rest.

As noted earlier, the pair of motion control levers or sticks may be mounted adjacent to or in front of the operator's seat, and can be connected to the vehicle transmission system (not shown) by cables 240. For example, in FIG. 4, a first cable 442 extends from a first rear portion 420 of the first controller 352 to a first terminal 422, and a second cable 444 extends from a second rear portion 424 of the second controller 354 to a second terminal 426. In one embodiment, each terminal serves as an anchoring connection for the cable to the transmission system (e.g., see FIGS. 8 and 9).

In different embodiments, the steering controllers are mounted onto the base frame 340. For example, each controller (352, 354) includes a control bracket that is connect to a frame bracket extending from the base frame 340. In the isometric view of FIG. 4, a first control bracket 412 can be seen attached to a proximally-facing (i.e., inwardly-facing toward a centerline between the two controllers) side of the first controller 352. In addition, a second control bracket 418, though not visible in this isometric view, can be understood to be attached to a proximally-facing side of the second controller 354. In one embodiment, each bracket is substantially planar, providing a substantially smooth outer surface for mounting flush against a corresponding frame bracket. In this case, the first control bracket 412 is configured for mounting to a first frame bracket 472 (as represented by a dotted line in FIG. 4), and the second control bracket 418 is configured for mounting to a second frame bracket 430. While the attachment mechanism can vary, in some embodiments, the two components are fastened together by a plurality of fasteners, such as fasteners 432, including but not limited to bolts, washers, nuts, and/or screws that are threaded or otherwise passed through a plurality of aperture sets formed in both the frame bracket and the control bracket in order to secure the two brackets together.

As an example, the first control bracket 412 includes a first aperture 414 that when mounted to the first frame bracket 472 is aligned with a second aperture 416. In FIG. 4, each frame bracket includes three apertures that are configured to align with three apertures formed in the corresponding control bracket. In one embodiment, the frame bracket has a generally triangular shape, and each aperture is disposed near a corner of the triangle. In addition, in some embodiments, each frame bracket extends or protrudes downward from an outer edge of the base frame 340, such that the frame bracket extends along a vertical plane that is substantially perpendicular relative to the horizontal plane of the base frame 340. In one embodiment, the base frame 340 has a substantially rectangular shape. In some cases, the base frame 340 has an opening in its interior, as shown in FIG. 4 that can be rectangular in shape as well. The opening in the base frame 340 can be aligned with a similar opening formed in the seat mounting plate 330 above in some embodiments.

In different embodiments, the steering controllers 150 are fixedly attached to the same support structure 490 as the seat. This helps ensure that any adjustments of the seat in the longitudinal direction are accompanied by a corresponding change in position of the controllers. Thus, in different embodiments, the support structure 490 includes provisions for fixedly mounting the seat mounting plate 330 to the base frame 340 below. As shown in FIG. 4, the base frame 340 includes a first tab portion 476 extending upward from an outer edge of the first side 182 of the base frame 340, and a second tab portion 484 extending upward from an outer edge of the second side 184 of the base frame 340. Similarly, the seat mounting plate 330 includes a third tab portion 474 extending upward from an outer edge of the first side 182 of the seat mounting plate 330, and a fourth tab portion 484 extending upward from an outer edge of the second side 184 of the seat mounting plate 330. In addition, in some embodiments, each tab portion extends or protrudes upward from an outer edge of the base frame 340 and/or seat mounting plate 330, such that the tab portions extend along a vertical plane that is substantially perpendicular relative to the horizontal plane of the base frame 340 and seat mounting plate 330.

In one embodiment, the seat mounting plate 330 and the base frame 340 have generally similar size and dimensions. The seat mounting plate 330 can include an outer perimeter that is sized to roughly match the perimeter of the bottom of the seat (see FIG. 3). However, in one embodiment, the seat mounting plate 330 has a width (relative to the lateral axis 180) that is slightly smaller than a width of the base frame 340 below, such that the two tab portions above are slightly offset toward the center relative to the two tab portions below. In other words, the "U"-shape formed by the third tab portion 474, fourth tab portion 482, and the substantially flat surface of the seat mounting plate 330 extending between them can be snugly received by a slightly wider U-shape formed by the first tab portion 476, second tab portion 484, and the substantially flat surface of the base frame 340 extending between them.

In one embodiment, the lower surface rests directly atop of the upper surface when assembled, such that the two are flush and in direct contact with one another, though in other embodiments there may be a small space between the two surfaces. Once the bottom surface of the seat mounting frame 330 has been disposed atop of or rests on the upper surface of the base frame 340, the first tab portion 476 and the third tab portion 474 are substantially parallel to and directly adjacent to one another, such that one or more apertures formed in each tab portion are aligned. Similarly, the second tab portion 484 and the fourth tab portion 482 are also substantially parallel to and directly adjacent to one another such that one or more apertures formed in each tab portion are aligned. Fasteners 432 can then be used to secure the seat mounting plate 330 and base frame 340 to one another.

Figure 5:
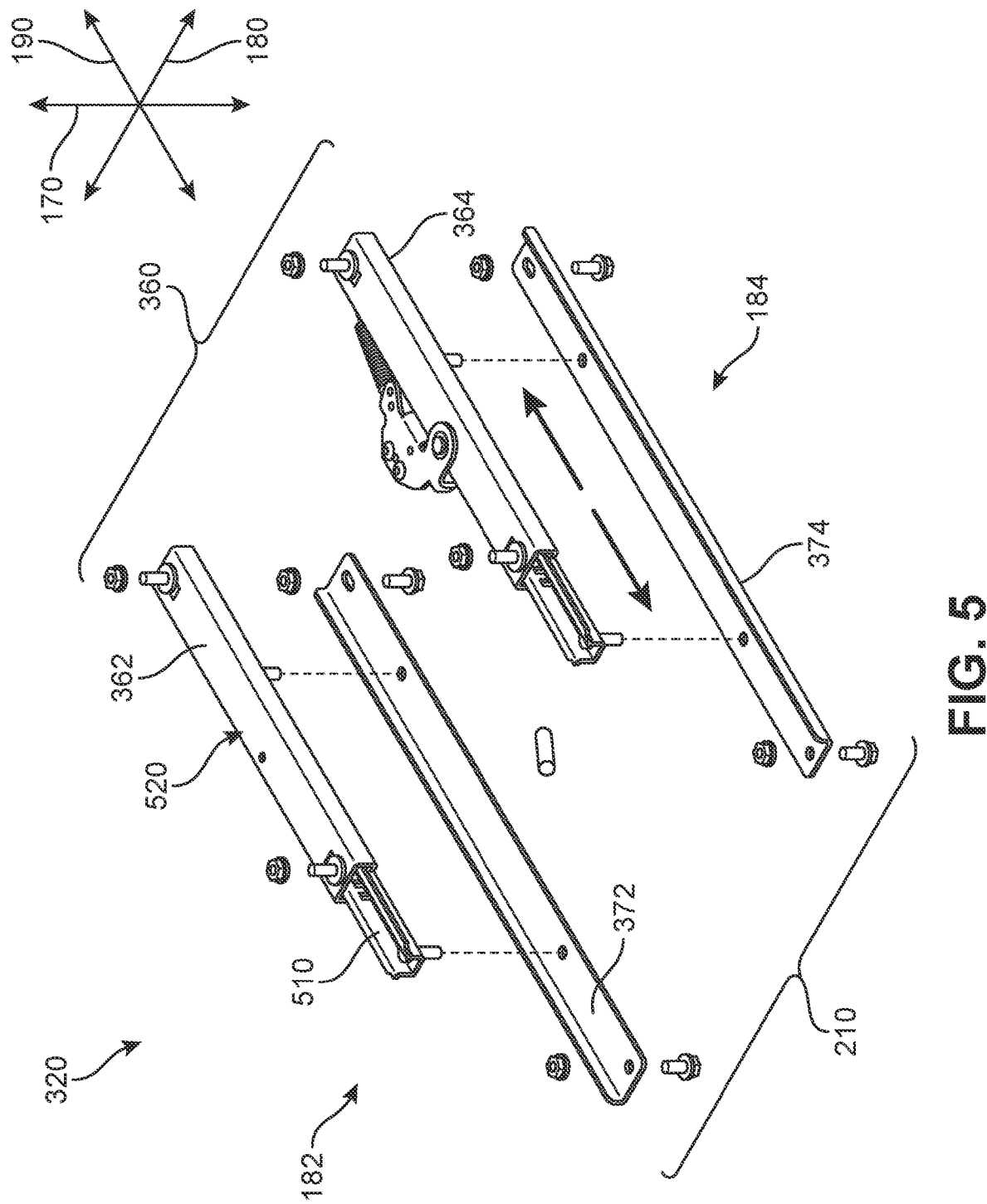
FIG. 5 is an isometric exploded view of a slider assembly of the adjustable seat assembly system, according to an embodiment.

Referring now to FIG. 5, additional details regarding the slider assembly 320 are discussed. As noted earlier, the support bars 210 are a pair of elongated longitudinal members that comprise first support bar 372 and second support bar 374. The first support bar 372 is disposed toward the first side 182 of the system and the second support bar 374 is disposed toward the second side 184 of system. While two individual support bars are included, it should be understood that in other embodiments, the two support bars can be formed as a singular piece connected to one another along the lateral plane. In some embodiments, the support bars are configured as stay brackets. In one embodiment, each support bar has a substantially L-shaped cross-section along the vertical-lateral plane. The support bars 210 are mounted onto the main body or chassis of the vehicle and remain fixed in position relative to the body of the vehicle. This is in contrast to the seat assembly 102, which is configured to move relative to the body of the vehicle (and the support bars 210). In other words, the seat assembly 102 can move back and forth while the support bars 210 remain fixed in place.

The movement of the seat assembly is permitted by the sliders 360 that are mounted onto the support bars 210. In this case, sliders 360 are longitudinal bars that include first slider 362 and second slider 364. While two individual sliders are included, it should be understood that in other embodiments, the two sliders can be formed as a singular piece connected to one another along the lateral plane. In some embodiments, the sliders are mounted onto the support bars below by connectors such as pegs that extend vertically downward from the sliders and are received by apertures formed in the rails (see dotted lines in FIG. 5). In other embodiments, other fastener mechanisms known in the art may be used to connect the two components together.

In different embodiments, the slider assembly 320 supports the seat and control assembly and enables the seat and control assembly to be adjusted along a longitudinal direction of the vehicle. For example, the lower surface of the base frame (see FIG. 4) is fixedly mounted directly atop of the upper surface of each slider. Embodiments are intended to include or otherwise cover any structure for connecting components of the support bars to any relevant part of the vehicle to provide support for the seat assembly. In the embodiment shown in FIG. 5, components of the slider assembly 320 are connected to a vehicle frame (not shown) so as to enable the seat assembly to be movable relative to the frame, such as between a plurality of lockable positions along the vehicle's longitudinal axis.

In different embodiments, each slider includes a sliding component 520 (e.g., a sliding bracket) that is movable longitudinally along a rail portion 510 of the slider. The sliding component 520 supports the seat assembly, the rail portion 510 supports the sliding components 520, and the sliding components 520 are supported by support bars 210 by virtue of their connection to the vehicle frame. As shown in FIG. 5, each of the rail portions 510 serves as a support bar upon which sliding components 520 are secured. In addition, sliding components 520 are configured to move back and forth in the longitudinal direction of the vehicle by controlled movement along the rail portions 510. Movement of the sliding components 520 results in longitudinal movement of the entire seat assembly mounted on the sliding components 520.

In different embodiments, the sliders are operated by a release handle (not shown here) which cooperates with a release handle pivot that is defined at a lower surface of the sliding components, to lock the sliding components at certain longitudinally spaced positions within the range of movement of the sliding brackets along the rails. In one embodiment, the release handle is manually actuatable, such as by a passenger seated in the seat, to lock and unlock the position of the sliding brackets, and thereby the entire seat assembly attached thereto. In another embodiment, the seat sliders are configured to move back and forth electronically as well (e.g., a motorized adjustment mechanism).

Figure 6:
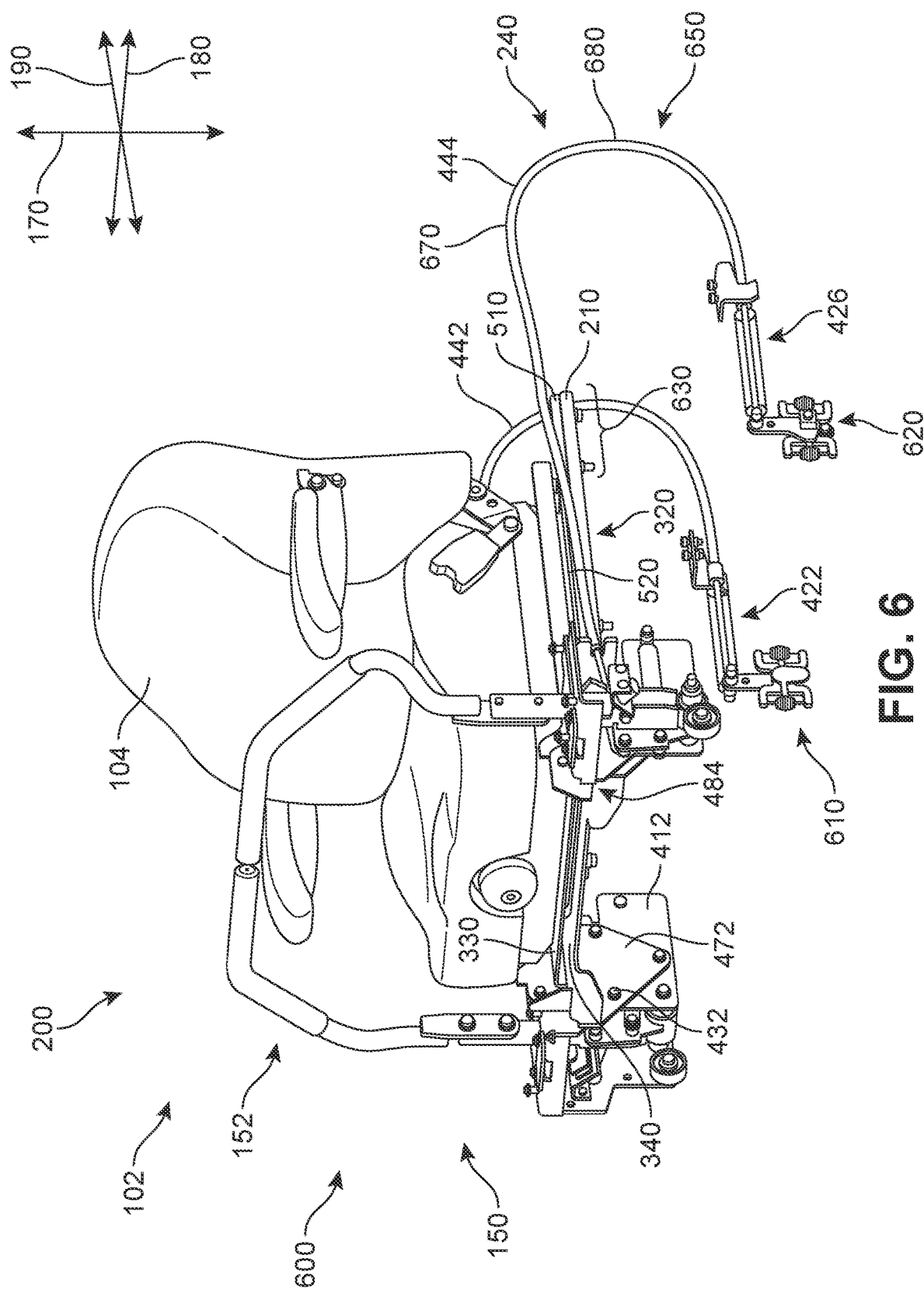
FIG. 6 is an isometric assembled view of the adjustable seat assembly system in a first configuration, according to an embodiment.
Figure 7:
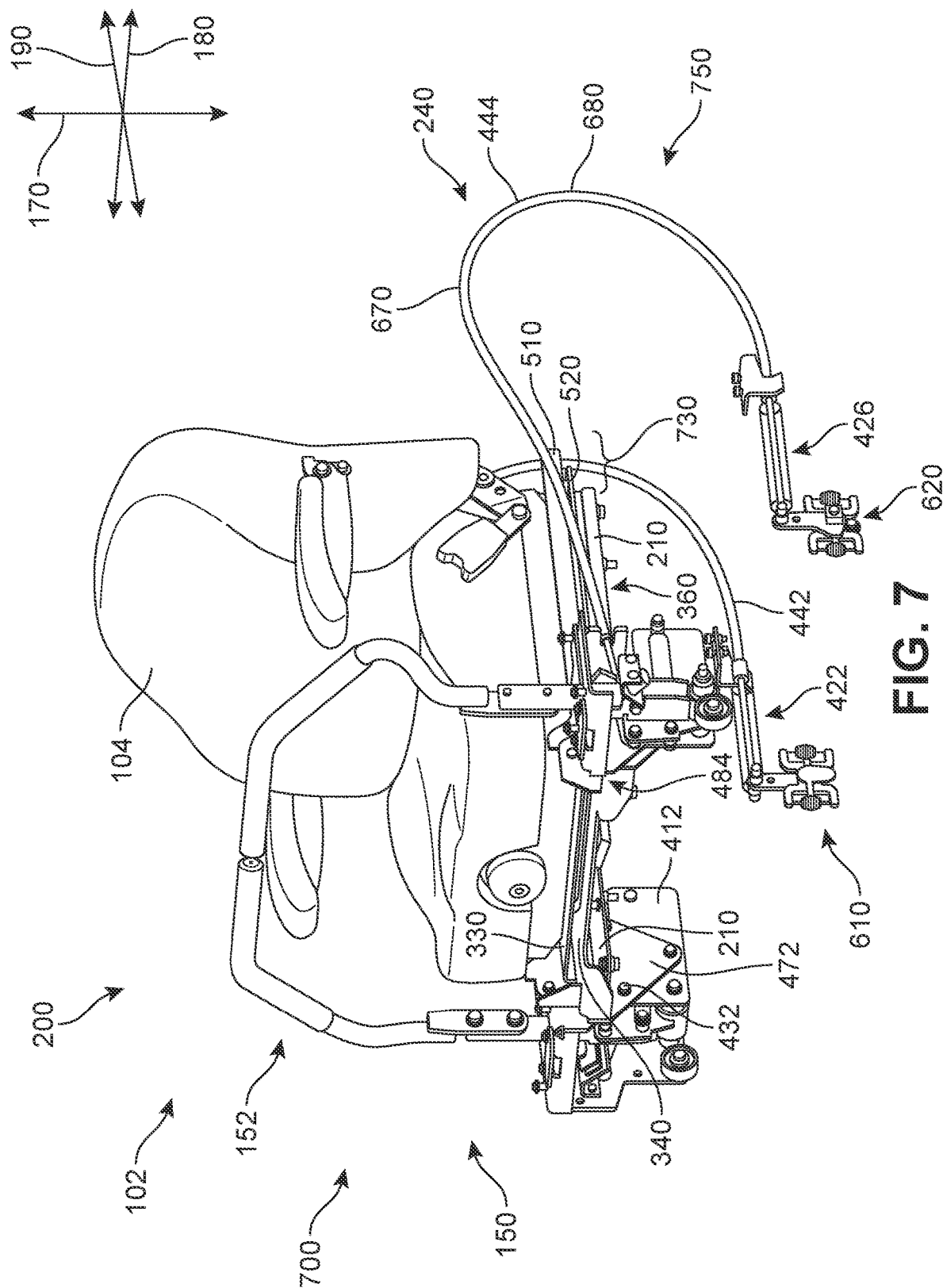
FIG. 7 is an isometric assembled view of the adjustable seat assembly system in a second configuration, according to an embodiment.

The system 200 is also illustrated in an assembled view in FIGS. 6 and 7. In FIG. 6, the system 200 is in a first configuration 600, and in FIG. 7 the system 200 is in a second configuration 700. It should be understood that while two positions are depicted, the operator is able to adjust the position of the seat assembly 150 in increments across the distance between the two configurations (600, 700) as well as further back until the limit of the sliders 360. In different embodiments, the distance that may be traversed by the seat assembly can vary depending on the length of the vehicle, the size of the seat, and the length of the slider assembly selected for the vehicle. As a non-limiting example, the distance can be between 150 mm and 300 mm. However, in other examples, the distance can be less than 150 mm and greater than 300 mm. In the examples presented herein, the distance may be approximately 191 mm.

In FIG. 6, the seat assembly 120, including sliding components 520, is disposed further forward relative to the rear end portions of both support bars 210 and both rail portions 510 (only one support bar and rail portion are visible in this isometric view). This can be more clearly observed in section 630, where a portion of the slider assembly 320 is exposed behind the seat 102. As discussed above, the seat assembly 120 rests on and is connected to sliding components 520, which are configured to slide back and forth along rail portions 510. The rail portions 510 maintain their position as they are fixedly attached to support bars 210. This relative movement is illustrated by reference to FIG. 7, where the seat assembly 120 has now transitioned from the first configuration 600 to the second configuration 700. This is represented by the change in relative position between the sliding components 520 and the rail portions 510 (see section 730). In this case, the exposed region of the slider assembly 360 shown in FIG. 6 is now covered. In some embodiments, the rear end of the sliding components 520 can extend or protrude outward (e.g., similar to an overhang) past the rear end of the support bars 210.

FIGS. 6 and 7 also illustrate the change in position of the cables 240 that occurs when the seat assembly 102 transitions between the first configuration 600 and the second configuration 700. In FIG. 6, the cables 240 are in a first position 650, where each cable has a more elongated shape. For purposes of reference, the second cable 444 can be understood to include a first segment 670 and a second segment 680. In FIG. 6, the first segment 670 is generally flat or straight, extending from the controller out toward the back with only a slight incline. The second segment 680 refers to the region of the second cable 444 where there is a bending in the cable, forming a U-shape until connecting to second terminal 426. In contrast, in FIG. 7 the first segment 670 of second cable 444 rises upward until bending along second segment 680. In other words, the second position 750 is a compressed state for the cable, while the first position 650 is an extended state.

In different embodiments, each terminal (422, 426) is connected to a movable mechanism (610, 620). Mechanisms (610, 620) are configured to control the swashplate inside the transmission (not shown here), enabling control of the direction and speed of the wheels. The mechanisms (610, 620) are responsive to the push/pull cable system. In other embodiments, a crank and gear system, or another electronically powered gear system, may be used.

Figure 8:
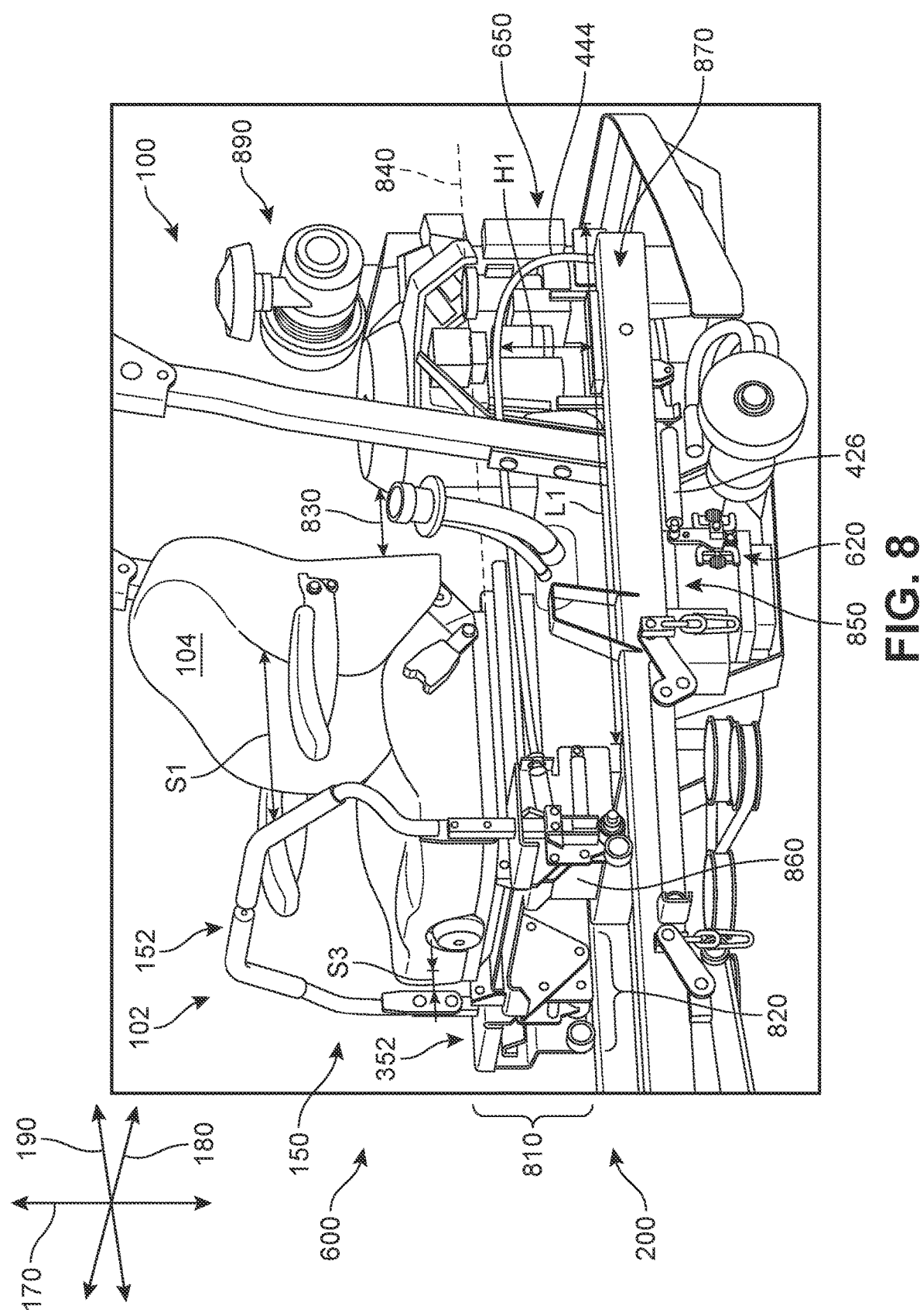
FIG. 8 is an isometric side view of a portion of the riding vehicle in which the adjustable seat assembly system is installed while in the first configuration, according to an embodiment.
Figure 9:
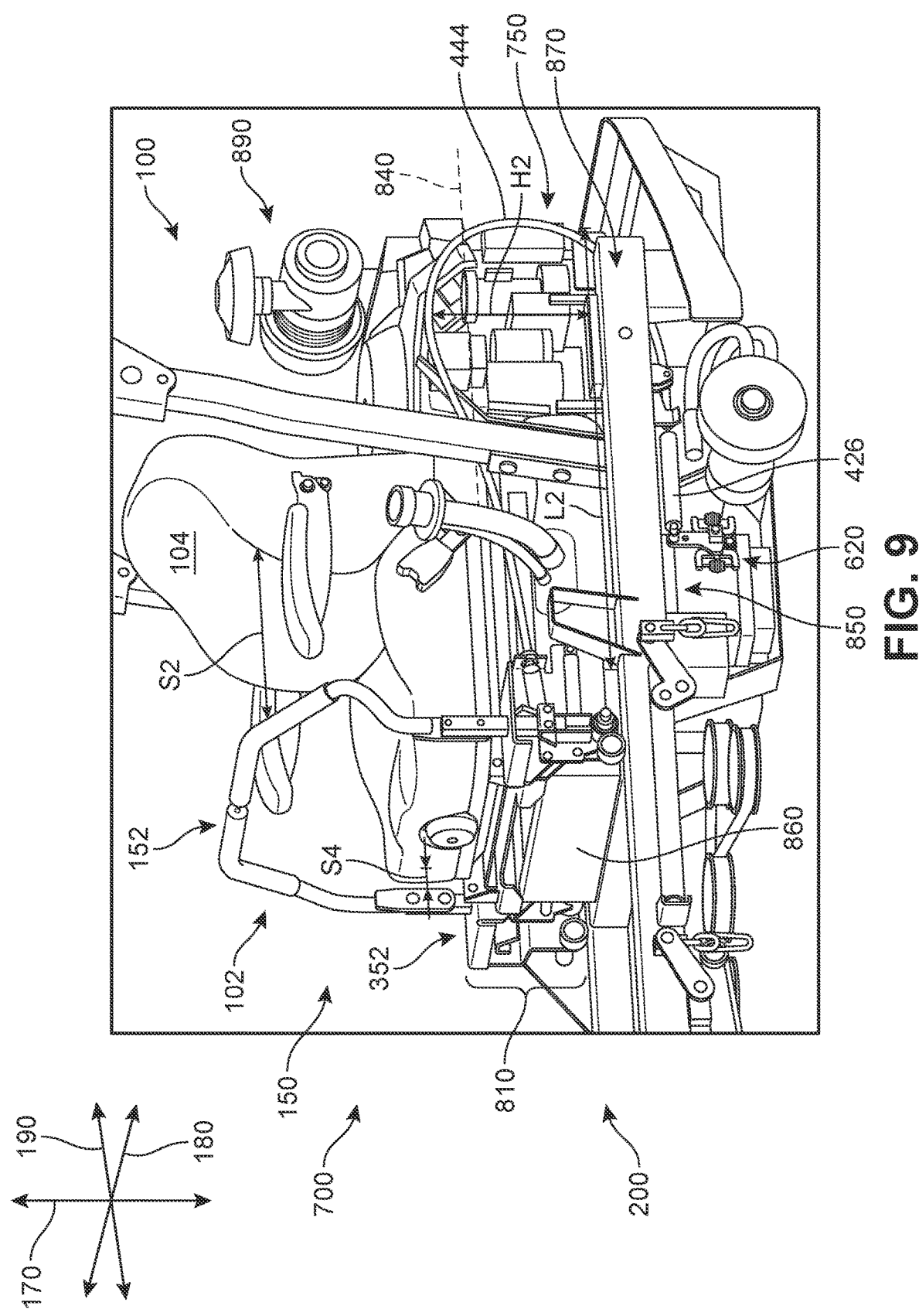
FIG. 9 is an isometric side view of a portion of the riding vehicle in which the adjustable seat assembly system is installed while in the second configuration, according to an embodiment.

Additional contextual details are provided now with reference to FIGS. 8 and 9, where the system 200 is shown installed in vehicle 100. In FIG. 8, the seat assembly 102 is in the first configuration 600, and in FIG. 9 the seat assembly is in the second configuration 700. In FIG. 8, it can be seen that when the seat 104 is pulled forward, the controllers are also moved forward. For example, a forward portion 810 and a bottom portion 820 of the first controller 352 protrudes outward from the base of the seat assembly 102. In other words, a large portion of the controllers are disposed forward relative to a support base 860 disposed between the two controllers and beneath seat 104. The support base 860 is mounted on a chassis 870 of the vehicle 100, and is configured to remain fixed in place. There is also a gap 830 between the backside of the seat 104 and vehicle machinery (e.g., mower components) 890.

Referring now to FIG. 9, it can be seen that when the seat 104 is pushed backward, the controllers are also moved rearward. For example, the forward portion and bottom portion have now moved such that they are mostly disposed rearward relative to support base 860. The gap between the backside of the seat 104 and vehicle machinery (e.g., mower components) has also been decreased. In different embodiments, when the seat assembly 102 is moved either forward or backward, the distance between the seat 104 and the levers 152 remain substantially similar. For example, in FIG. 8, there is a first spacing S1 between seat 104 and levers 152 (in neutral); in FIG. 9, there is a second spacing S2 between seat 104 and levers 152 (in neutral), and the first spacing S1 and second spacing S2 are substantially the same. Similarly, in FIG. 8 there is a third spacing S3 between the lever bracket and the seat (in neutral); in FIG. 9, there is a fourth spacing S4 between the lever bracket and the seat (in neutral), and the third spacing S3 and fourth spacing S4 are substantially the same.

As noted earlier, the cables connecting the controllers with the transmission are configured to change position in order to accommodate the changes in the longitudinal position of the seat assembly. In FIG. 8, it can be seen that the second cable 444 is in the first position 650, and has a maximum height relative to the chassis 870 of first height H1. In FIG. 9, the second cable 444 is in the second position 750, and has a maximum height relative to the chassis 870 of second height H2, where first height H1 is smaller than second height H2. For example, second cable 444 does not rise above a height level 840 (see dotted line) of the bottom of seat 104 in FIG. 8, while in FIG. 9, second cable 444 curves upward above the same height level 840. In addition, because the cable is bent, a first longitudinal length L1 of the second cable 444 can be larger than a second longitudinal length L2 of the second cable 444 (where longitudinal length in this case refers not to the length of the cable itself but to how far the cable extends from one end to another along the longitudinal axis). Though the cable itself undergoes changes in position and arrangement as the seat assembly 102 moves, the second terminal 426 remains substantially rigid and stable, allowing the mechanism 620 to continue to operate transmission 850 unaffected by any adjustments of the position of the seat 104 and steering controllers 150.

Figure 10:
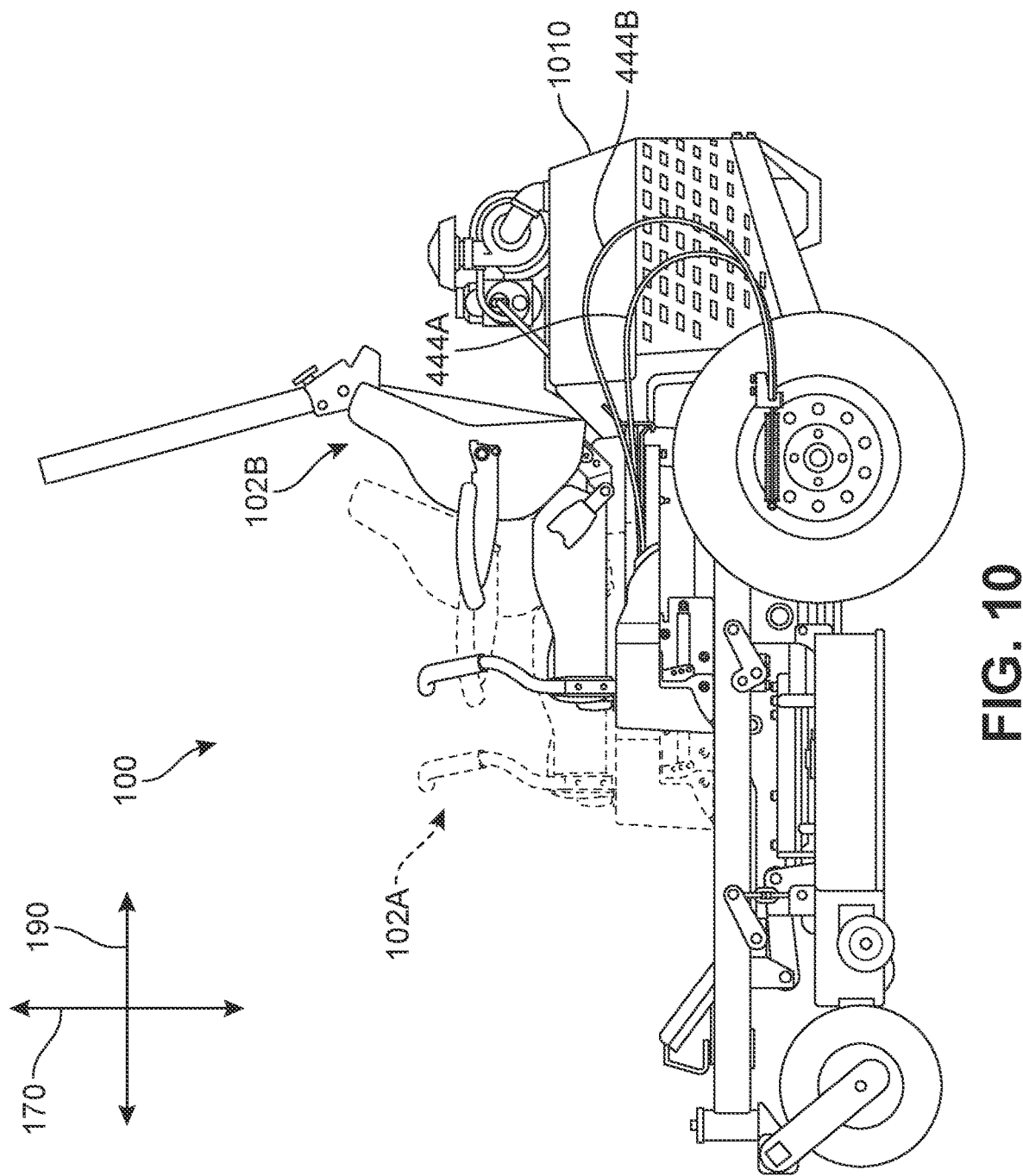
FIG. 10 is a side view of the riding vehicle in which two seating positions are depicted, according to an embodiment.

The two configurations of system 200 are depicted mounted on vehicle 100 in a side overlap view in FIG. 10. In this view, the change in position of the cables within a rear housing 1010 of the vehicle 100 can be better appreciated. In this depiction, a rear housing (cover) 1010 of the vehicle 100 has been included. The rear housing 1010 encloses a rear portion of the vehicle on which vehicle machinery is disposed. In different embodiments, when seat assembly 102 is in the first configuration (represented by "A") and the second configuration (represented by "B") the second cable 444 is able to move freely within an internal chamber enclosed by rear housing 1010. In addition, the vehicle machinery disposed within internal chamber is centered to allow space on either side of the chamber for the cables to be routed. Thus, the vehicle 100 provides sufficient clearance within the rear housing 1010 for the cables to move without obstruction from the first position to the second position and back to the first position.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. An adjustable seat assembly system for a vehicle comprising:
   a seat assembly including a seat and at least a first steering controller disposed at a first distance from the seat;
   a slider assembly; and
   wherein the seat and first steering controller are both mounted on the slider assembly, such that the first distance is maintained between the seat and first steering controller when an adjustment of the position of the seat occurs in a longitudinal direction.

2. The system of claim 1, wherein the first steering controller includes a lever that extends across a portion of the seat.

3. The system of claim 1, wherein the slider assembly includes a pair of support bars configured to be mounted to a chassis of the vehicle, and the support bars remain fixed relative to the chassis when the seat assembly is moved.

4. The system of claim 1, wherein the first steering controller and seat are both fixedly attached to a support system that comprises a mounting plate fixedly attached to a base frame.

5. The system of claim 4, wherein the seat is fixedly attached to the mounting plate and the first steering controller is fixedly attached to the base frame.

6. The system of claim 4, wherein the base frame includes a first tab portion that is connected to a second tab portion of the mounting plate.

7. The system of claim 4, wherein the first steering controller includes a control bracket that is mounted on a frame bracket of the base frame.

8. The system of claim 4, wherein the mounting plate is disposed between a first tab portion extending upward from a first side of the base frame and a second tab portion extending upward from a second side of the base frame.

9. The system of claim 1, wherein the first steering controller includes a base component, and the system further comprises a first cable that extends outward from the base component and is configured to connect to a transmission of the vehicle.

10. The system of claim 1, wherein the slider assembly includes a pair of sliders, each slider includes a sliding portion and a rail, and the sliding portion is configured to move relative to the rail.

11. A riding vehicle with an adjustable seat assembly system, the riding vehicle comprising:
a chassis;
a slider assembly mounted onto the chassis;
a support structure connected to the slider assembly;
a seat and a first steering controller both fixedly attached to the support structure, the first steering controller disposed at a first distance from the seat;
wherein a change in longitudinal position of the seat is accompanied by a corresponding change in longitudinal position of the first steering controller, such that the first distance is maintained between the seat and first steering controller when an adjustment of the position of the seat occurs in the longitudinal direction.

12. The riding vehicle of claim 11, wherein the riding vehicle further comprises a first cable connected to the first steering controller at a first end and to a transmission of the riding vehicle at a second end.

13. The riding vehicle of claim 12, wherein the riding vehicle includes a first configuration in which the seat is at its furthest forward position and a second configuration in which the seat is at its furthest rearward position, and the first cable has a longitudinal length that is smaller in the second configuration than in the first configuration.

14. The riding vehicle of claim 13, wherein the first cable has a maximum height above the chassis in the second configuration that is greater than in the first configuration.

15. The riding vehicle of claim 12, wherein the first cable is a push pull cable.

16. The riding vehicle of claim 11, wherein the riding vehicle is a zero-turn radius lawn mower.

17. A seat assembly adjustment mechanism for facilitating concurrent positional adjustments of a seat at least a first steering controller along a longitudinal direction of a vehicle, the mechanism comprising:
a pair of sliders that extend substantially parallel to the longitudinal direction of the vehicle;
a mounting plate that supports the seat;
a base frame that supports the mounting plate and the steering controllers, wherein the base frame is configured to be movable along the pair of sliders;
wherein the seat and first steering controller are disposed at a first distance from one another, and the first distance is maintained between the seat and first steering controller when an adjustment of the position of the seat occurs in the longitudinal direction.

18. The mechanism of claim 17, wherein the first steering controller includes a control bracket with a first plurality of apertures that align with a second plurality of apertures on a frame bracket of the base frame.

19. The mechanism of claim 17, further comprising a pair of support bars mounted to a vehicle chassis, the support bars supporting the pair of sliders.

20. The mechanism of claim 17, wherein the base frame includes a first tab portion that is fixedly attached to a second tab portion of the mounting plate.

* * * * *